April 16, 1957 — O. WALDRICH — 2,788,564
MACHINE TOOL
Filed April 29, 1952 — 5 Sheets-Sheet 1

Inventor:
O. Waldrich

April 16, 1957 O. WALDRICH 2,788,564
MACHINE TOOL
Filed April 29, 1952 5 Sheets-Sheet 2

Inventor:
O. Waldrich

April 16, 1957  O. WALDRICH  2,788,564
MACHINE TOOL

Filed April 29, 1952  5 Sheets-Sheet 3

Inventor:
O. Waldrich

April 16, 1957     O. WALDRICH     2,788,564
MACHINE TOOL

Filed April 29, 1952     5 Sheets-Sheet 4

Inventor:
O. Waldrich

April 16, 1957     O. WALDRICH     2,788,564
MACHINE TOOL
Filed April 29, 1952     5 Sheets-Sheet 5
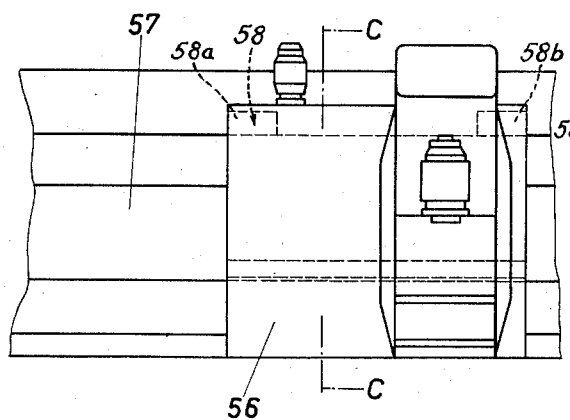
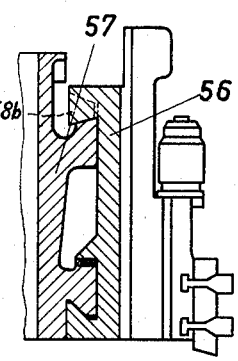

United States Patent Office 2,788,564
Patented Apr. 16, 1957

2,788,564

MACHINE TOOL

Oskar Waldrich, Siegen, Westphalia, Germany

Application April 29, 1952, Serial No. 284,887

Claims priority, application Germany April 30, 1951

5 Claims. (Cl. 29—1)

This invention relates to machine tools and in particular to the sliding members used for the adjustment or feeding of the tool or workpiece.

It has already been proposed to make individual members of a machine tool clampable; such clamping has served to prevent further movement of the members. In these arrangements play of members relative to one another was in no way removed, because the clamping devices were not constructed and adapted to effect this. For these reasons it was also not usual to hold these members reliably clamped during each working operation.

In contradistinction the essence of the present invention is that a sliding member serving for the adjustment or feed of the tool or workpiece, preferably every such part, is automatically clamped firmly and without play to its slideway during working operations of the machine. For the sake of security, the best arrangement is for the sliding member normally to be firmly clamped and only to be released automatically during its movement.

Preferably the release according to the invention is initiated, controlled or effected by the means for moving the sliding member such as a screwed spindle, shaft or the like, at the beginning of its movement, the clamping means being again set in action by the means for moving the member coming to rest or by the termination of the application of power action for effecting the movement of the part. The practical realisation of the invention may be effected by means of clamping devices such as clamps or wedge-strips which effect the clamping action under the action of strong springs or the like, while the means for moving the member is provided with operating or control members such as cams, eccentrics, control rods or the like, which acting through known devices such as hydraulic pistons, electromagnets or the like, or mechanical devices such as link, rod or lever mechanisms, first release the clamping means by urging them against the springs or the like which are thus further loaded, and then for example by taking up play or lost motion included in the means for transmitting movement to the sliding member—say by the inclusion of a dog clutch or the like having play—effect the movement of the sliding member, and at the end of the movement when the member is finally disconnected, uncoupled or stopped the springs are permitted to return the clamping means into action.

The clamping means according to the invention can be applied to the carriage, cross-slide and top-slide of a lathe, to a part such as a tailstock sliding on the bed of a lathe, to the tool head and vertical slide and to the tool slide also if such is carried on the vertical slide, of a planing machine, and to the cross and vertical motions of the table and to the tool slide of a shaping machine.

Some examples of embodiment of the invention are illustrated in the accompanying drawings.

Fig. 9b is a top plan view of a support and Fig. 9c is a section on line c—c of Fig. 9b;

Figure 1:
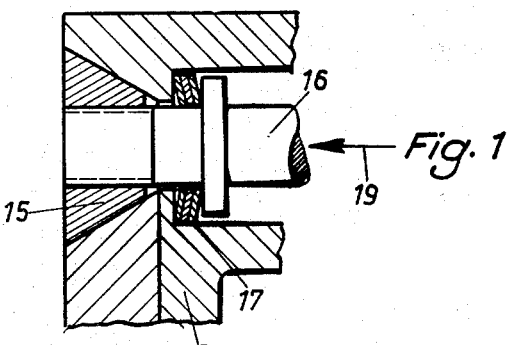
Figure 1 is a detail section showing one form of clamping means which can be employed.

Figure 1 shows in section a wedge strip 15 which, by a pile of plate springs 17 acting through a bolt 16 secured to the strip 15, is clamped in a seating formed by corresponding surfaces provided respectively on a sliding machine tool member 18 such as a tailstock or carriage, and on the machine bed or the like on which the member 18 slides. The springs are accommodated in the sliding member 18 e. g. in the tailstock or carriage. A force can be applied by some convenient transmission means e. g. a hydraulic piston, an eccentric, a lever, or the like, in the direction of the arrow 19, the transmission means being so arranged that such a force is first applied to all the similar bolts 16 against the action of the springs 17 before the member 18 is moved, the strip or strips 15 associated with the member thus being released by the lateral movement of the bolt or bolts 16 and the movement of the member 18 then being effected. At the end of this movement the force 19 on the bolts 16 is released when the springs 17 draw the strip or strips 15 back into clamping position.

Figure 2:
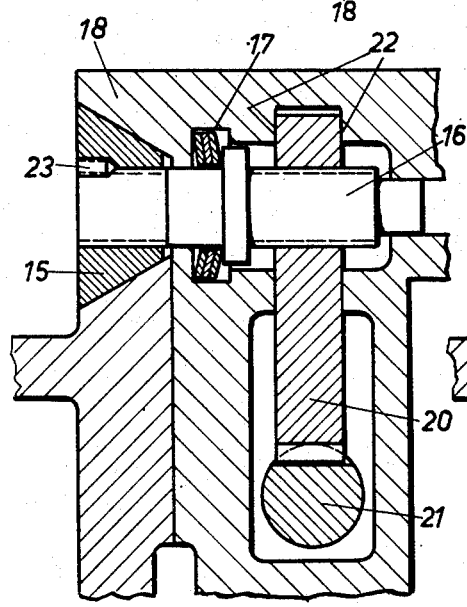
Figures 2 to 5 are similar detail sections showing the same clamping means as Figure 1 with four different methods of releasing the clamping means, Figure 2a being a detail modification of Figure 2.

In Figure 2, to apply the force in the direction of the arrow 19 of Figure 1, a toothed segment 20 is provided which by a rack 21 can be rotated on the bolt 16. The segment 16 is restrained against movement in the axial direction of the bolt by surfaces 22 in the member 18 and it has screw-threaded engagement with the bolt 16 so that when the rack 21 is actuated in the appropriate direction the segment through its threaded engagement with the bolt moves the latter axially as required. The bolt is locked against rotation relative to the strip 15 by a grub-screw 23.

Figure 2A:
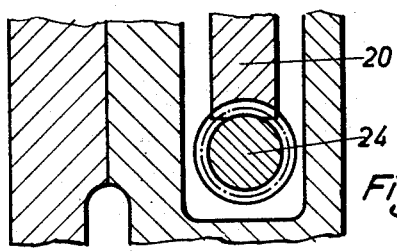

Figure 2a relates to a similar construction to Figure 2, but instead of the rack 21 of Figure 2, a worm 24 is provided which meshes with corresponding teeth of the segment 20. Thus the rotation of the segment is effected by rotation of the worm 24 instead of the longitudinal motion of the rack 21 of Figure 2.

Figure 3:
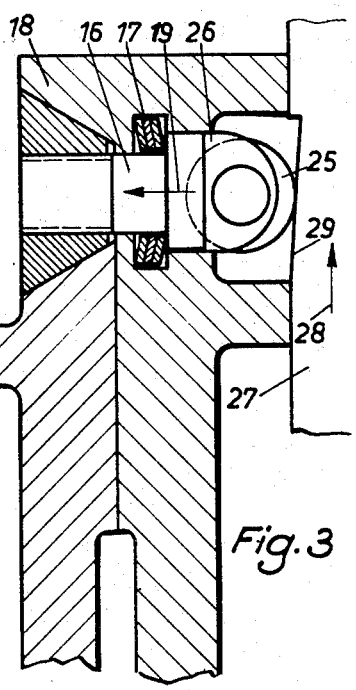

Figure 3 shows the bolt 16 provided with a roller 25 which is journalled by the aid of two lateral cheeks 26. In the member 18 a slider 27 is mounted to slide in the direction of the arrow 28, and it has an inclined running surface 29 for the roller. When the slider is moved in the direction of the arrow 28, the bolt 16 is thrust in the direction of the arrow 19 and the clamping action of the strip 15 is released.

Figure 4:
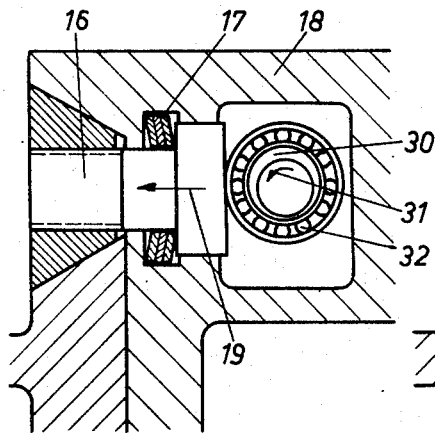

According to Figure 4, the movement of the bolt 16 in the member 18 is effected by the aid of a cam in the form of an eccentric 30 located beyond the end of the bolt, which can be rotated in the direction of the arrow 31 to effect unclamping and on which to reduce friction a rolling bearing 32 is mounted. Here again unclamping is effected by thrusting the bolt 16 in the direction of the arrow 19, thus also compressing the pile of plate springs 17.

Figure 5:
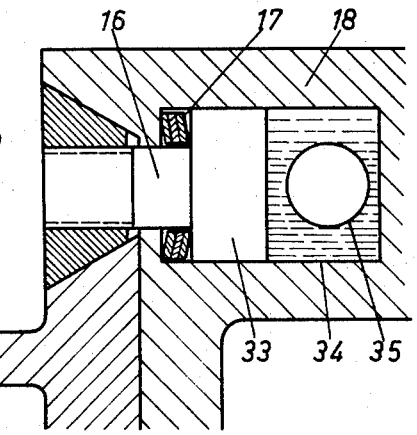

Figure 5 shows an embodiment in which the head 33 of the bolt 16 is constructed as a piston which works fluid-tight in a cylindrical bore 34. Into the bore, through an opening 35, a hydraulic pressure fluid, e. g. oil is supplied, and the bolt 16 is thrust forward, and the clamping of slidable member 18 is released, the springs 17 being at the same time further compressed.

Figure 6:
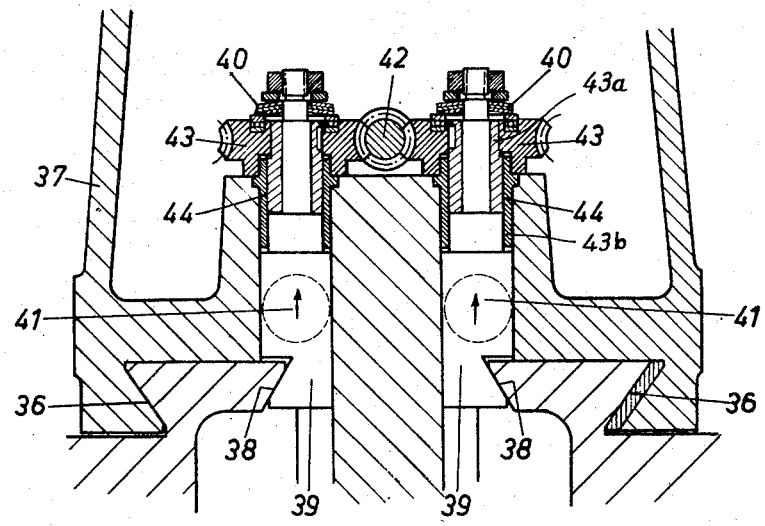
Figure 6 is a cross section of another form of clamping means and releasing mechanism.

Figure 6 shows an arrangement which is particularly advantageous for use on lathes. A member 37 sliding on the bed, e. g. a tailstock, is guided by lateral guideways 36 and is clamped by the aid of a dovetail-sectioned slot 38 in the bed by means of the correspondingly shaped heads of two bolts 39 which are guided without lateral play and are drawn up in the direction of the arrow 41 by piles of springs 40. Unclamping of this device is effected by the aid of a worm 42 which meshes with two worm-wheels 43 which are slidably keyed to respective externally threaded sleeves 43a rotatable on the bolts and engaged in internally threaded fixed sleeves 43b. When the sleeves 43a are rotated in the appropriate direction they move downwards and through shoulders on the bolts 39 force the latter downwards thus releasing the clamping while further compressing the springs 40. This arrangement ensures accurate centreing of the sliding member in the clamped portion.

Figures 7, 7A:
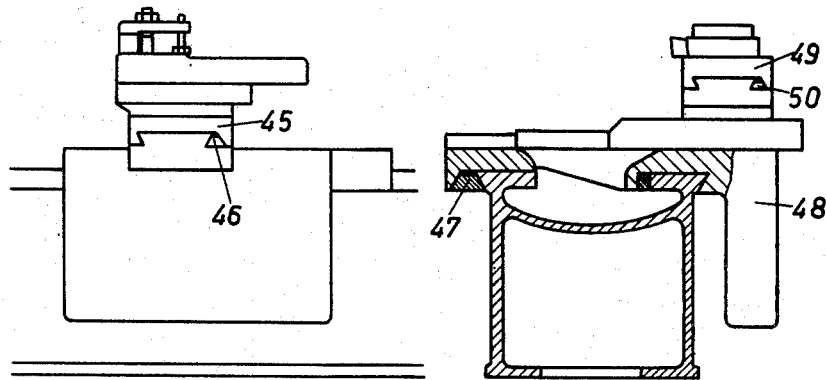
Figures 7 and 7a are a front view and a cross section respectively, illustrating the application of the invention to a lathe.

Figures 7 and 7a show how clamping in the manner generally described above with reference to Figures 1 to 5 can be applied to the cross-slide 45 of the lathe by means of a wedge strip 46, and at the same time to the carriage 48 by a wedge strip 47 and to the top-slide 49 by a wedge strip 50.

Figures 8, 8A:
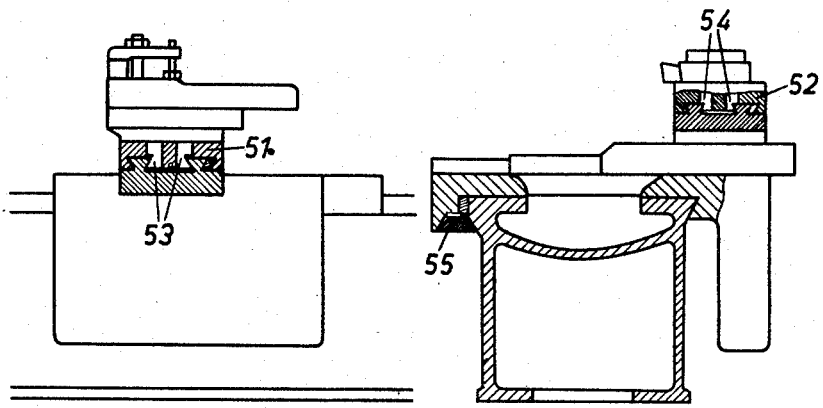
Figures 8 and 8a are a front view partly in section and a cross section respectively, illustrating another form of application of the invention to a lathe.

Figures 8 and 8a show in a similar fashion how clamping in the manner described with reference to Figure 6 can be applied to the cross-slide 51 and the top slide 52 of a lathe by means of dovetail-headed bolts 53 and 54 respectively, while the carriage is clamped as above described with reference to Figures 7 and 7a by the aid of a wedge-strip 55.

Figure 9:
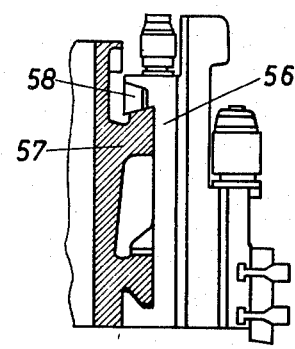
Figures 9 and 9a are a detail side view and a detail plan view respectively, both partly in section, illustrating the application of the invention to a planing machine.
Figure 9A:
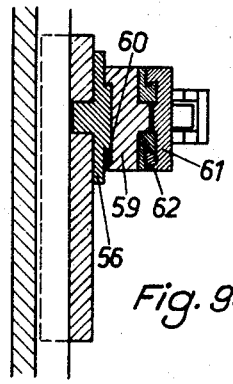

Figures 9 and 9a shows the clamping of the movable parts of the tool head of a planing machine. Figure 9 shows the head 56 itself clamped to the cross beam 57 by a wedge strip 58, and as appears from Figure 9a the vertical slide 59 is clamped to the head 56 by a wedge strip 60. These figures also show the tool carried not by a clapper but by a tool slide 61 which is pivotally mounted on the vertical slide 59 and by which the tool is automatically moved at the correct times between a retracted and a working position. This tool slide 61 is also provided with a wedge-strip 62 by which it is clamped in accordance with the present invention.

In the construction shown in Figs. 9b and 9c the wedge strip does not extend across the entire head but is divided into two parts 58a and 58b one of which is arranged at each end of the head. Otherwise the construction is similar to that shown in Figs. 9 and 9a.

Figure 10:
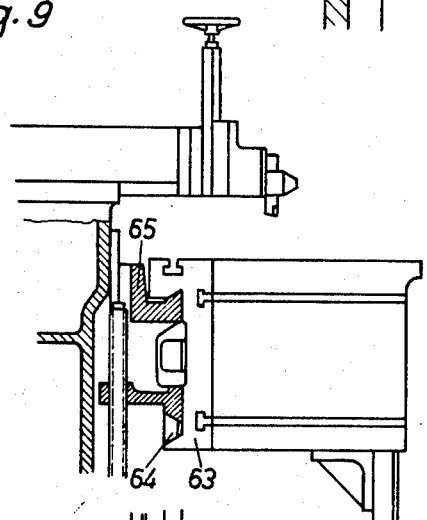
Figures 10 and 10a are a detail side view and a detail plan view respectively, both partly in section, illustrating the application of the invention to a shaping machine.
Figure 10A:
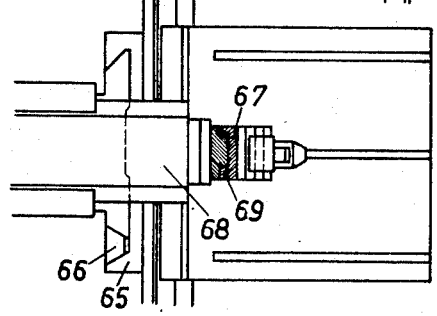

Figures 10 and 10a illustrate the application of the invention to a shaping machine. Here the cross feed of the table 63 is provided with a wedge strip 64, the height adjustment of the table 65 on the body of the machine is provided with a wedge strip 66, while the tool slide 67 is clamped to the ram 68 by a wedge strip 69.

It is to be understood that where the clamping means (as in all three slides in Figures 7 and 7a and in the carriage of Figures 8 and 8a) when released constitutes part of the actual guiding means for the sliding member, when the sliding member is fed during the machining operation, e. g. the carriage of a lathe during parallel turning or screw cutting, or the cross slide during facing, the release movement must be enough to allow the sliding member to move with the necessary freedom, but not so much as to permit excessive play or shake.

What I claim is:

1. A combined clamping and releasing arrangement for machine tools of the type having a slide and a slideway consisting of a device comprising in combination with the slide and the slideway a wedge-strip between said slide and slideway, a bolt connected at one end to said wedge strip and axially shiftable in said slide, a pack of frustro-conical springs between said bolt and said slide tending to pull said wedge into its clamping position between said slide and said slideway, and of a releasing device comprising in combination with the bolt of the clamping device, a roller rotatably mounted on the free end of said bolt, and a sliding member having a surface bearing against said roller to shift said bolt axially against the action of said springs to disengage the clamping device.

2. A combined clamping and releasing arrangement for machine tools of the type having at least one slide and at least one slideway, each slide including at least one device each comprising in combination with the slide and the slideway a wedge strip between said slide and slideway, a bolt connected at one end to said wedge strip and axially shiftable in said slide, a pack of frustro-conical springs between said bolt and said slide normally pulling said wedge into its clamping position between said slide and said slideway, and a releasing device comprising means operative prior to movement of said slide to push against the free end of said bolt to compress said spring and to shift said bolt axially against the action of said springs to disengage the clamping device.

3. The device of claim 2, in which said means operative to push against the free end of said bolt comprises an eccentric member adapted, upon rotation, to bear against the free end of said bolt to shift said bolt to disengaging position.

4. The device of claim 2, in which said means operative to push against the free end of said bolt comprises a piston formed on the end of said bolt, a source of fluid under pressure, a fluid-tight cylinder cooperating with said piston to receive fluid under pressure from said source to shift said bolt into disengaging position under the influence of said fluid under pressure within said cylinder.

5. The device of claim 2, in which said means operative to push against the free end of said bolt comprises screw threads on said bolt end, a nut running on said threads, said nut being rotatably mounted in said slide and restrained against axial movement, a toothed segment on the outer edge of said nut, and a rack engaging said toothed segment whereby upon actuation of said rack said nut is rotated to shift said bolt to disengaging position.

References Cited in the file of this patent

UNITED STATES PATENTS

| 2,123,825 | De Vlieg | July 12, 1938 |
| 2,273,844 | Drissner | Feb. 24, 1942 |
| 2,430,677 | Hobart | Nov. 11, 1947 |
| 2,555,386 | Zimmerman | June 5, 1951 |